(12) United States Patent
Oh et al.

(10) Patent No.: US 8,820,184 B2
(45) Date of Patent: Sep. 2, 2014

(54) MANUAL TRANSMISSION FOR VEHICLES

(75) Inventors: Wan Soo Oh, Yongin-si (KR); Jae Woong Hwang, Yongin-si (KR); Haeng Woo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 672 days.

(21) Appl. No.: 13/174,388

(22) Filed: Jun. 30, 2011

(65) Prior Publication Data

US 2012/0137805 A1 Jun. 7, 2012

(51) Int. Cl.
*F16H 3/089* (2006.01)

(52) U.S. Cl.
USPC .................................. 74/333; 335/473.36

(58) Field of Classification Search
CPC ............... F16H 2200/0052; F16H 2003/0931; F16H 3/089; F16H 2200/0056
USPC ................... 74/339, 329, 325, 340, 331, 333
See application file for complete search history.

(56) References Cited

U.S. PATENT DOCUMENTS

| | | | | |
|---|---|---|---|---|
| 5,385,065 A | * | 1/1995 | Hofmann | 74/331 |
| 5,591,097 A | * | 1/1997 | Petri et al. | 475/207 |
| 6,109,128 A | * | 8/2000 | Mazet | 74/339 |
| 2002/0148311 A1 | * | 10/2002 | Kobayashi | 74/339 |
| 2010/0242647 A1 | * | 9/2010 | Okadome et al. | 74/331 |
| 2011/0203409 A1 | * | 8/2011 | Nishida et al. | 74/665 A |
| 2011/0214521 A1 | * | 9/2011 | Rockenbach et al. | 74/331 |

FOREIGN PATENT DOCUMENTS

| | | |
|---|---|---|
| EP | 1077336 A1 | 2/2001 |
| JP | 2009-180291 A | 8/2009 |
| KR | 1020020088188 A | 11/2002 |
| KR | 1020060056668 A | 5/2006 |
| KR | 10-0828673 B1 | 5/2008 |
| KR | 10-0862463 B1 | 10/2008 |

* cited by examiner

*Primary Examiner* — Troy Chambers
*Assistant Examiner* — Valentin Craciun
(74) *Attorney, Agent, or Firm* — Morgan, Lewis & Bockius LLP

(57) ABSTRACT

A manual transmission for vehicles minimizes rotational inertia and improves rattle as a consequence of preventing unnecessary idling of a first speed gear and a reverse speed gear by maintaining a first input gear to be a free gear state at all shift-speeds except a first forward speed and a reverse speed.

10 Claims, 10 Drawing Sheets

FIG. 1
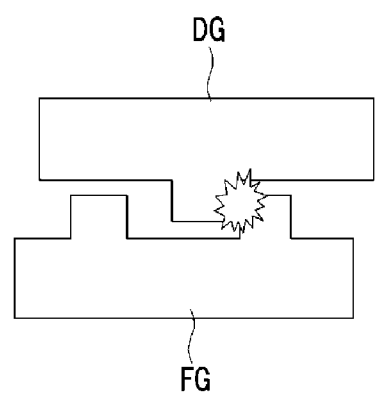
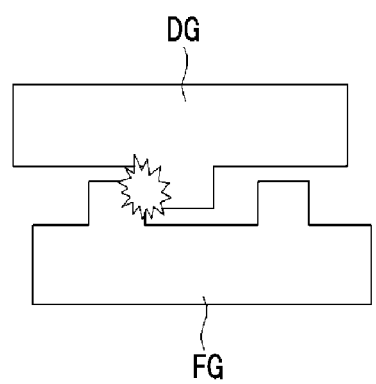

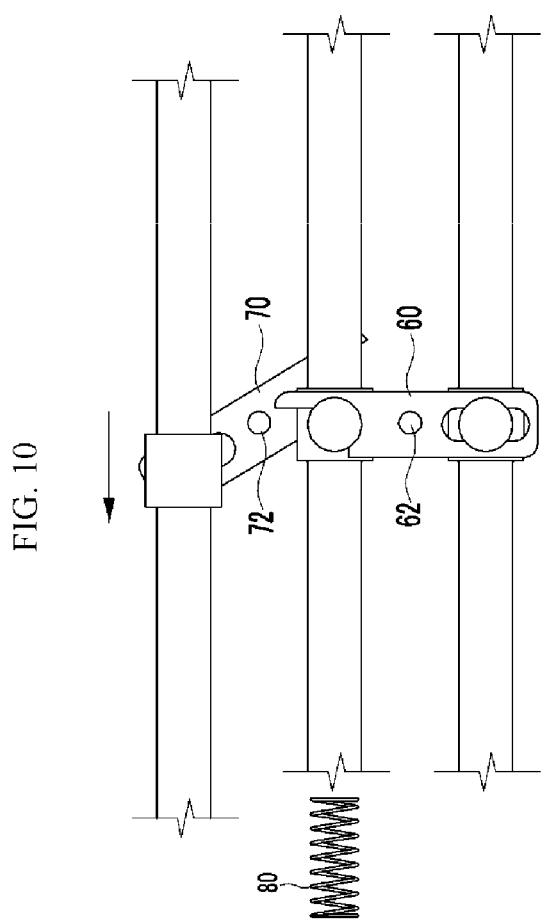

MANUAL TRANSMISSION FOR VEHICLES

CROSS-REFERENCE TO RELATED APPLICATION

This application claims priority to and the benefit of Korean Patent Application No. 10-2010-0123022 filed Dec. 3, 2010, the entire contents of which application is incorporated herein for all purposes by this reference.

BACKGROUND OF INVENTION

1. Field of Invention

The present invention relates to a manual transmission for vehicles. More particularly, the present invention relates to a manual transmission for vehicles that minimizes rotational inertia and improves rattle as a consequence of preventing unnecessary idling of a first speed gear and a reverse speed gear by maintaining a first input gear to be a free gear state at all shift-speeds except a first forward speed and a reverse speed.

2. Description of Related Art

Generally, vibration is generated by impact when teeth of free gears disposed on rotation shafts freely bumps into driving gears fixedly disposed on the rotation shafts. A rattle in a manual transmission for vehicles means that the vibration generated by the impact is transmitted to the rotation shafts, bearings, and a transmission case and noise occurs.

If load is not applied to a free gear FG, teeth of the free gear FG is not engaged with both teeth of a driving gear DG as shown in FIG. 1. At this state, if load (exciting force of an engine) is applied to the free gear FG, the free gear FG moves easily and the teeth of the free gear FG bumps into the teeth of the driving gear DG. Therefore, double side impact occurs, and thereby the rattle occurs.

When the rattle occurs, the double side impact which the free gear FG applies to the rotation shaft is proportional to rotational inertia of the free gear FG, and rattle sensitivity is proportional to total rotational inertia of the free gears.

Gear arrangement of a conventional manual transmission will be described. As shown in FIG. 2, gears that are related to each shift-speed are disposed on an input shaft PIS and an output shaft POS disposed in parallel with the input shaft PIS with a predetermined distance.

A first input gear GI1, a second input gear GI2, a first synchronizer mechanism PSYN1 including third and fourth input gears GI3 and GI4, and a second synchronizer mechanism PSYN2 including fifth and sixth input gears GI5 and GI6 are sequentially disposed on the input shaft PIS from a front side to a rear side.

Herein, the front side means a side close to an engine and the rear side means a side that is far from the engine.

The first input gear GI1 and the second input gear GI2 are integrally formed with the input shaft PIS so as to rotate together with the input shaft PIS when the input shaft PIS rotates.

In addition, the third, fourth, fifth, and sixth input gears GI3, GI4, GI5, and GI6 are disposed such that rotations of the third, fourth, fifth, and sixth input gears GI3, GI4, GI5, and GI6 are not directly affected by rotation of the input shaft IS (that is, free gear), and each input gear GI3, GI4, GI5, and GI6 rotates together with the input shaft PIS through selective engagement with sleeves PS1 and PS2.

In addition, a first output gear POG1, a third synchronizer mechanism PSYN3 having first and second speed gears GO1 and GO2 engaged respectively to the first and second input gears GI1 and GI2, and third, fourth, fifth, and sixth speed gears GO3, GO4, GO5, and GO6 engaged respectively to the third, fourth, fifth, and sixth input gears GI3, GI4, GI5, and GI6 are disposed on the output shaft POS.

The first and second speed gears GO1 and GO2 are disposed such that rotations of the first and second speed gears GO1 and GO2 do not directly affect on rotation of the output shaft POS (that is, free gear), and rotate together with the output shaft POS through selective engagement with a sleeve PS3. The third, fourth, fifth, and sixth speed gears GO3, GO4, GO5, and GO6 are integrally formed with the output shaft POS.

In addition, a second output gear POG2 and a fourth synchronizer mechanism PSYN4 having a reverse speed gear PRG engaged to the first speed gear GO1 are disposed on a reverse speed output shaft PRS disposed in parallel with the input shaft PIS.

The reverse speed gear PRG is disposed such that rotation of the reverse speed gear PRG does not directly affect on rotation of the reverse speed output shaft PRS, and rotates together with the reverse speed output shaft PRS through selective engagement with a sleeve PS4.

In addition, the first and second output gears POG1 and POG2, as shown in FIG. 3, are engaged to driven gear PDG of a differential so as to output converted torque.

Since the first, second, third, and fourth synchronizer mechanisms PSYN1, PSYN2, PSYN3, and PSYN4 are the same as or similar to a conventional synchronizer mechanism applied to a conventional manual transmission, detailed description thereof will be omitted. In addition, each sleeve PS1, PS2, PS3, and PS4 of the first, second, third, and fourth synchronizer mechanisms PSYN1 PSYN2, PSYN3, and PSYN4, as well known to a person of skilled in the art, is operated by a shift fork that is operated by a shift lever disposed at a driver's seat.

Since the reverse speed gear PRG is always engaged with the first speed gear GO1 and the first speed gear GO1 is always engaged with the first input gear GI1 in the manual transmission as shown in FIG. 3, the reverse speed gear PRG and the first speed gear GO1 are idling at shift-speeds other than a first forward speed and a reverse speed and rattle occurs if the input shaft PIS rotates.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a manual transmission for vehicles having advantages of minimizing rotational inertia and improving rattle as a consequence of preventing unnecessary idling of a first speed gear and a reverse speed gear by maintaining a first input gear to be a free gear state at all shift-speeds other than a first forward speed and a reverse speed.

One aspect of the present invention is directed to a manual transmission for vehicles that may include an input shaft having first, second, third, fourth, fifth, and sixth input gears disposed thereon, an output shaft disposed in parallel with the input shaft with a predetermined distance and having a first output gear and first, second, third, fourth, fifth, and sixth speed gears disposed thereon, the first, second, third, fourth, fifth, and sixth speed gears being respectively engaged with the first, second, third, fourth, fifth, and sixth input gears, and a reverse speed output shaft disposed in parallel with the output shaft with a predetermined distance and having a second output gear and a reverse speed gear disposed thereon, the reverse speed gear being engaged with the first speed gear, wherein the first input gear is selectively connected to the input shaft by a first synchronizer mechanism, the second input gear is integrally formed with the input shaft, the third and fourth input gears are selectively connected to the input shaft by a second synchronizer mechanism, the fifth and sixth input gears are selectively connected to the input shaft by a third synchronizer mechanism, the first and second speed gears are selectively connected to the output shaft by a fourth synchronizer mechanism, the third, fourth, fifth, and sixth speed gears are integrally formed with the output shaft, and the reverse speed gear is selectively connected to the reverse speed output shaft by a fifth synchronizer mechanism.

The manual transmission may further include a first shift rail operating the fifth synchronizer mechanism, a second shift rail operating the first synchronizer mechanism, a third shift rail operating the fourth synchronizer mechanism, a fourth shift rail operating the second synchronizer mechanism, and a fifth shift rail operating the third synchronizer mechanism.

The first, second, third, fourth, and fifth shift rails may be sequentially disposed.

The first, third, fourth, and fifth shift rails may be respectively provided with a shift lug for moving a corresponding shift rail.

The manual transmission may further include a synchronizer operating device moving the second shift rail by a movement of the first shift rail or the third shift rail.

The synchronizer operating device may include a first rotation link connecting the first shift rail with the second shift rail and moving the second shift rail to an opposite direction of a moving direction of the first shift rail when the fifth synchronizer mechanism is operated, and a second rotation link connecting the second shift rail with the third shift rail and moving the second shift rail to an opposite direction of a moving direction of the third shift rail when the fourth synchronizer mechanism is operated.

The synchronizer operating device may further include an elastic member supplying elastic force for returning the second shift rail moved by the movement of the first shift rail or the third shift rail to an original position.

The second rotation link may be adapted to move the second shift rail in a case the third shift rail moves to one direction and not to move the second shift rail in a case that the third shift rail moves to the other direction.

The first rotation link may be configured that the movement of the third shift rail is not affected by the movement of the first shift rail.

The second rotation link may be configured that the movement of the first shift rail is not affected by the movement of the third shift rail.

In a manual transmission according to various embodiments of the present invention, a first input gear on an input shaft may be engaged with a first speed gear on an output shaft and a reverse speed gear on a reverse speed output shaft may be engaged with the first speed gear. The first input gear may be selectively connected to the input shaft by a first synchronizer mechanism. The manual transmission may further include a synchronizer operating device that operates the first synchronizer mechanism by operations of a fourth synchronizer mechanism and a fifth synchronizer mechanism.

The synchronizer operating device may further include a first rotation link interposed between a first shift rail for operating the fifth synchronizer mechanism and a second shift rail for operating the first synchronizer mechanism and adapted to push the second shift rail to an opposite direction of a moving direction of the first shift rail, a second rotation link interposed between a third shift rail for operating the fourth synchronizer mechanism and the second shift rail for operating the first synchronizer mechanism and adapted to push the second shift rail to an opposite direction of a moving direction of the third shift rail, and an elastic member supplying elastic force to the second shift rail to an original position.

The first rotation link may have both end portions and a middle portion. The middle portion may be hinged to a transmission housing, the one end portion may have a slot having a predetermined length along a length direction thereof such that a hinge protrusion fixed to the first shift rail is slidably inserted in the slot, and the other end portion may have a side that is cut and the other side formed of a supporting portion for supporting a protrusion fixed to the second shift rail.

The second rotation link may have both end portions and a middle portion. The middle portion may be hinged to the transmission housing, the one end portion may have a side that is cut and the other side formed of a supporting portion for supporting a protrusion fixed to the second shift rail, and the other end portion may have a slot having a predetermined length along a length direction thereof such that a hinge protrusion fixed to the third shift rail is slidably inserted in the slot.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a schematic diagram for explaining occurrence of rattle.

FIG. 10 is an operational diagram of an exemplary synchronizer mechanism at a second forward speed according to the present invention.

DETAILED DESCRIPTION

Figure 2:
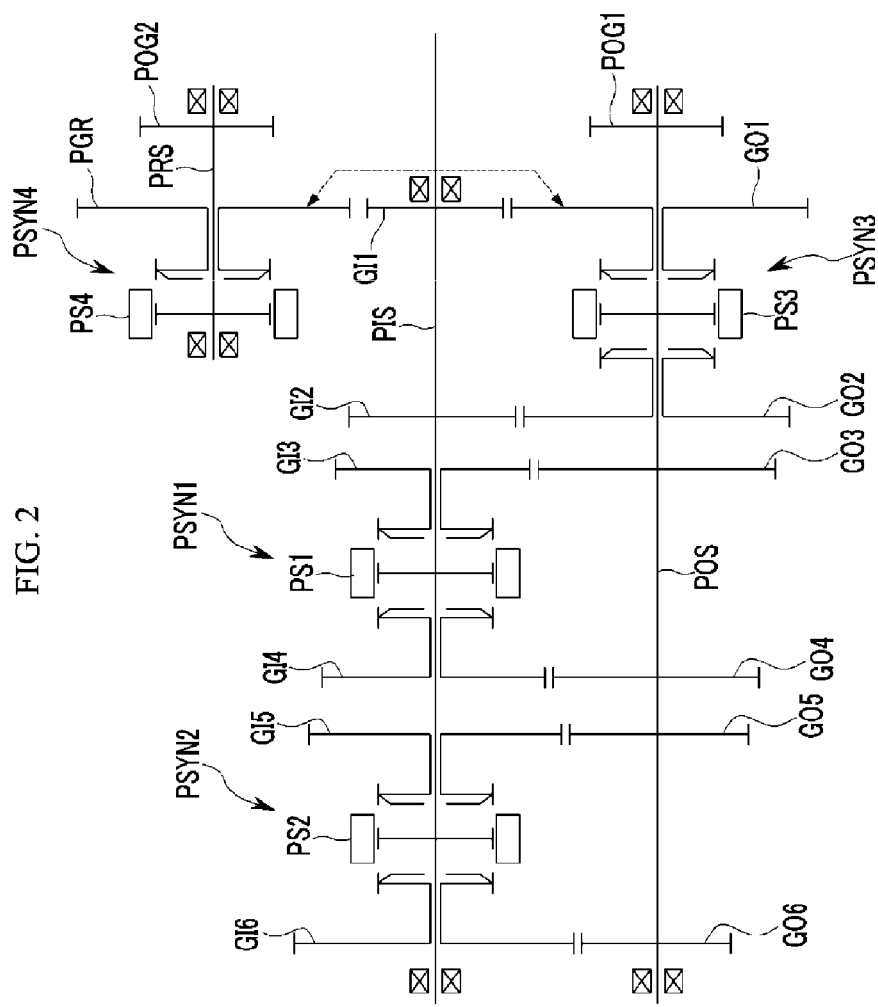
FIG. 2 is a schematic diagram of a conventional manual transmission.
Figure 3:
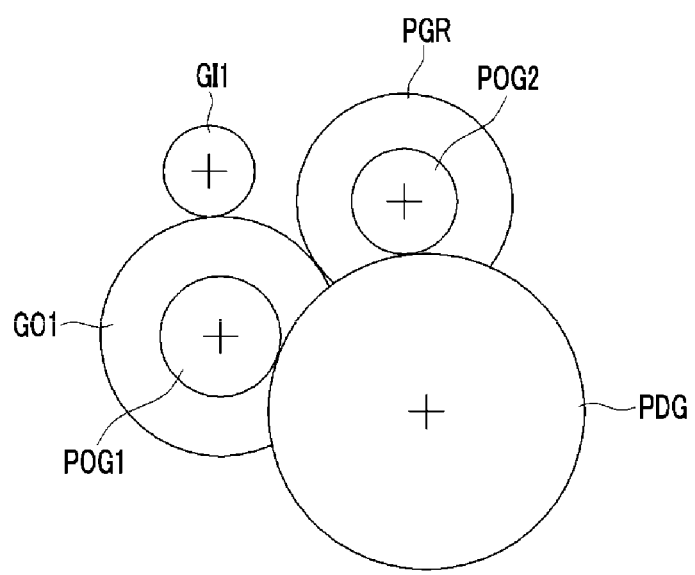
FIG. 3 is a schematic diagram for showing engagement of gears related to a reverse speed in a conventional manual transmission.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Description of components that are not necessary for explaining the present invention will be omitted, and the same constituent elements are denoted by the same reference numerals in this specification.

Figure 4:
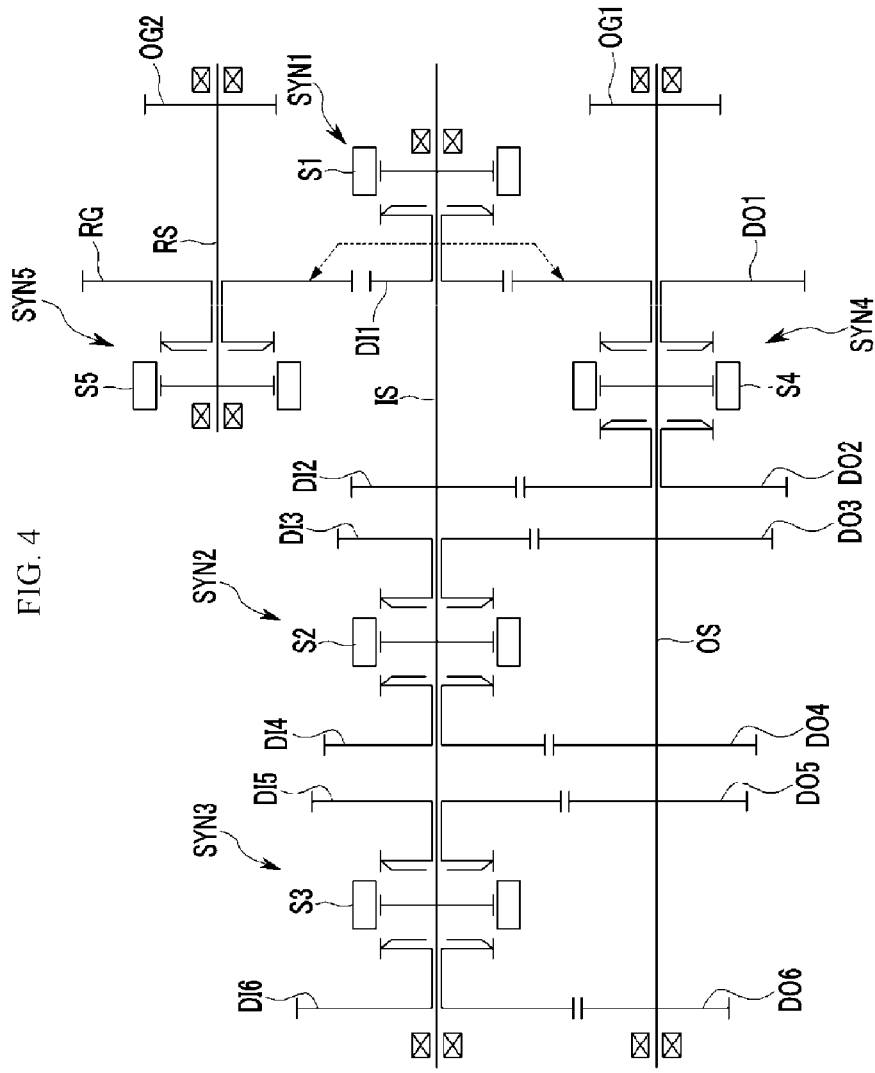
FIG. 4 is a schematic diagram of an exemplary manual transmission according to the present invention.

FIG. 4 is a schematic diagram of a manual transmission according to various embodiments of the present invention. In the drawings, IS represents an input shaft, OS represents an output shaft, and RS represents a reverse speed output shaft.

Rotation shafts IS, OS, and RS are rotatably mounted at a transmission case by interposing rolling elements therebetween, and are disposed in parallel with each other with predetermined distances.

First, second, third, fourth, fifth, and sixth input gears DI1, DI2, DI3, DI4, DI5, and DI6 are sequentially disposed on the input shaft IS from a front side to a rear side.

Herein, the front side means a side close to an engine and the rear side means a side that is far from the engine.

In addition, the first input gear DI1 is disposed so as not to be directly affected by rotation of the input shaft IS (free gear) and is selectively connected to the input shaft IS through a first synchronizer mechanism SYN1. The second input gear DI2 is integrally formed, and may be monolithically formed, with the input shaft IS.

In addition, the third, fourth, fifth, and sixth input gears DI3, DI4, DI5, and DI6 are disposed so as not to be directly affected by the rotation of the input shaft IS (free gear), the third and fourth input gears DI3 and DI4 are selectively connected to the input shaft IS through a second synchronizer mechanism SYN2, and the fifth and sixth input gears DI5 and DI6 are selectively connected to the input shaft IS through a third synchronizer mechanism SYN3.

Therefore, the first, third, fourth, fifth, and sixth input gears DI1, DI3, DI4, DI5, and DI6 are selectively engaged with each sleeve S1, S2, and S3 provided at each of the first, second, and third synchronizer mechanisms SYN1, SYN2, and SYN3 so as to rotate with the input shaft IS.

In addition, a first output gear OG1, a fourth synchronizer mechanism SYN4 having first and second speed gears DO1 and DO2 respectively engaged with the first and second input gears DI1 and DI2, and third, fourth, fifth, and sixth speed gears DO3, DO4, DO5, and DO6 respectively engaged with the third, fourth, fifth, and sixth input gears DI3, DI4, DI5, and DI6 are disposed on the output shaft OS.

The first and second speed gears DO1 and DO2 are disposed so as not to directly affect rotation of the output shaft OS (free gear) and rotates with the output shaft OS by selectively engagement with a sleeve S4 of a fourth synchronizer mechanism SYN4. The third, fourth, fifth, and sixth speed gears DO3, DO4, DO5, and DO6 are integrally formed, and may be monolithically formed, with the output shaft OS In addition, a second output gear OG2 and a fifth synchronizer mechanism SYN5 having a reverse speed gear RG engaged with the first speed gear DO1 are disposed on the reverse speed output shaft RS disposed in parallel with the input shaft IS.

The reverse speed gear RG is disposed so as not to directly affect on rotation of the reverse speed output shaft RS, and rotates with the reverse speed output shaft RS by selective engagement with a sleeve S5 of a fifth synchronizer mechanism SYN5.

In addition, the first and second output gears OG1 and OG2 are engaged to a driven gear of a differential so as to output converted torque.

Since the first, second, third, fourth, and fifth synchronizer mechanisms SYN1, SYN2, SYN3, SYN4, and SYN5 are the same as or similar to a synchronizer mechanism applied to a conventional manual transmission, detailed description thereof will be omitted. In addition, each sleeve S1, S2, S3, S4, and S5 of the first, second, third, fourth, and fifth synchronizer mechanisms SYN1, SYN2, SYN3, SYN4, and SYN5, as well known to a person of skill in the art, is operated by a shift fork that is operated by a shift lever disposed at a driver's seat.

Power delivery paths of the manual transmission at each shift-speed will be discussed.

The torque is output through the input shaft IS, the first input gear DI1, the first speed gear DO1, the output shaft OS, and the first output gear OG1 at a first forward speed, is output through the input shaft IS, the second input gear DI2, the second speed gear DO2, the output shaft OS, and the first output gear OG1 at a second forward speed, is output through the input shaft IS, the third input gear DI3, the third speed gear DO3, the output shaft OS, and the first output gear OG1 at a third forward speed, is output through the input shaft IS, the fourth input gear DI4, the fourth speed gear DO4, the output shaft OS, and the first output gear OG1 at a fourth forward speed, is output through the input shaft IS, the fifth input gear DI5, the fifth speed gear DO5, the output shaft OS, and the first output gear OG1 at a fifth forward speed, is output through the input shaft IS, the sixth input gear DI6, the sixth speed gear DO6, the output shaft OS, and the first output gear OG1 at a sixth forward speed, and is output through the input shaft IS, the first input gear DI1, the first speed gear DO1, the reverse speed gear RG, the reverse speed output shaft RS, and the second output gear OG2 at a reverse speed.

In a manual transmission according to various embodiments of the present invention, the first input gear DI1 is not integrally formed with the input shaft IS but is disposed as a free gear, and the first synchronizer mechanism SYN1 is used for connecting the first input gear DI1 with the input shaft IS.

In a case that the first synchronizer mechanism SYN1 is in a neutral state, the torque of the input shaft IS is not delivered to the first input gear DI1 and the first speed gear DO1 and the reverse speed gear RG do not rotate. Therefore, occurrence of rattle due to rotational inertia may be improved.

In a case of shifting to the first forward speed, however, the first synchronizer mechanism SYN1 and the fourth synchronizer mechanism SYN4 are simultaneously operated. In a case of shifting to the reverse speed, the first synchronizer mechanism SYN1 and the fifth synchronizer mechanism SYN5 are simultaneously operated.

Figure 5:
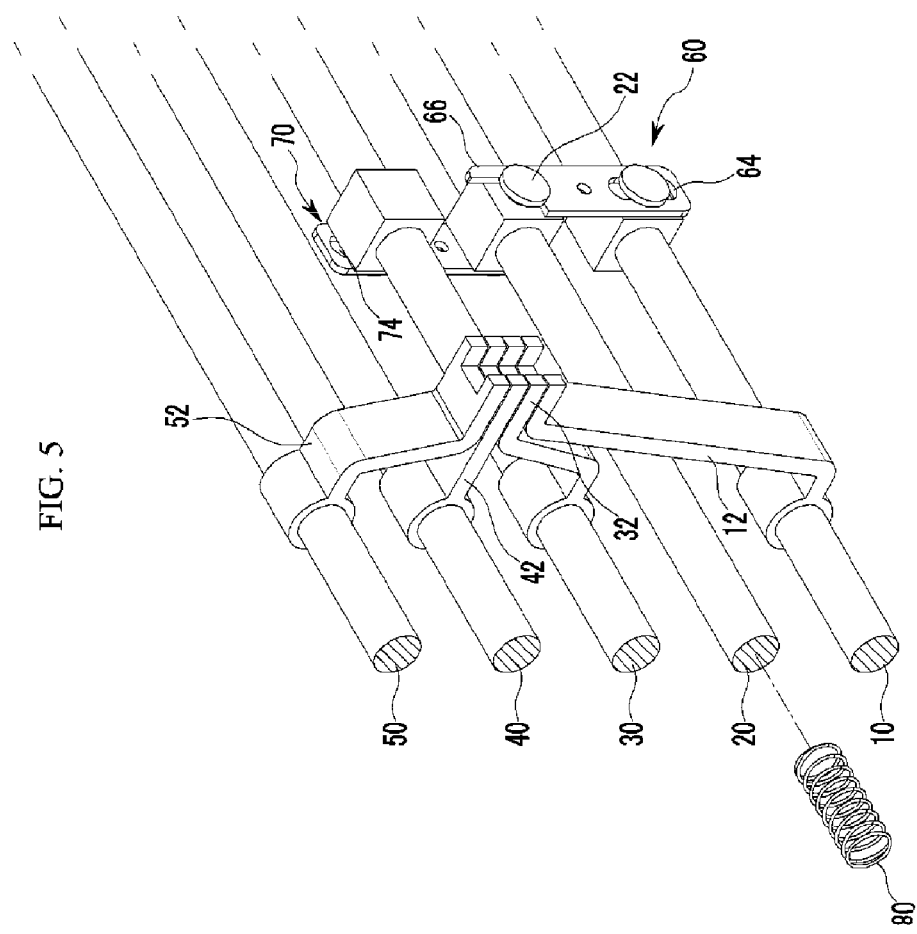
FIG. 5 is a schematic diagram of an exemplary shift rail and an exemplary synchronizer operating device applied to various embodiments of the present invention.

Accordingly, at least five shift rails are necessary in a manual transmission according to various embodiments of the present invention. Referring to FIG. 5, shift rails applied to a manual transmission according to various embodiments of the present invention will be described.

As shown in FIG. 5, a manual transmission according to various embodiments of the present invention includes a first shift rail 10, a second shift rail 20, a third shift rail 30, a fourth shift rail 40, and a fifth shift rail 50. The first, second, third, fourth, and fifth shift rails 10, 20, 30, 40, and 50 are sequentially disposed from one side to the other side.

Shift lugs 12, 32, 42, and 52 operated by a control finger is mounted on shift rails 10, 30, 40, and 50 except the second shift rail 20, and shift fork for operating the sleeves S5, S1, S4, S2, and S3 of the fifth, first, fourth, second, and third synchronizer mechanisms SYN5, SYN1, SYN4, SYN2, and SYN3 is disposed at each shift rail 10, 20, 30, 40, and 50.

A control finger of the control shaft pushes a selected shift lug among the shift lugs 12, 32, 42, and 52 to an axial direction by control of the shift lever. Therefore, a shift fork disposed on a corresponding shift rail operates a corresponding sleeve so as to perform shifting.

If the sleeve S1 of the first synchronizer mechanism SYN1 is moved to the left in the drawing and the sleeves S4 and S5 of the fourth and fifth synchronizer mechanisms SYN4 and SYN5 are moves to the right in the drawing in the manual transmission according to various embodiments of the present invention, shifting to the first forward speed or the reverse speed is performed. Therefore, when shifting to the first forward speed or the reverse speed, the second shift rail 20 moves to an opposite direction of the first or third shift rail 10 and 30.

Figure 6:
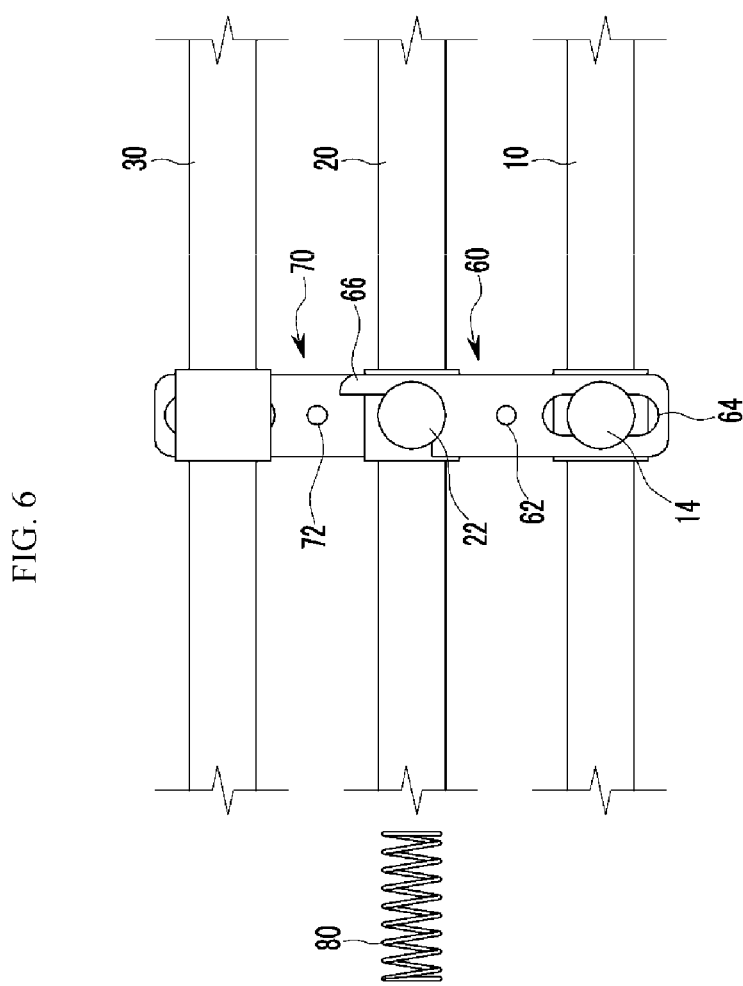
FIG. 6 is a front view of FIG. 5.
Figure 7:
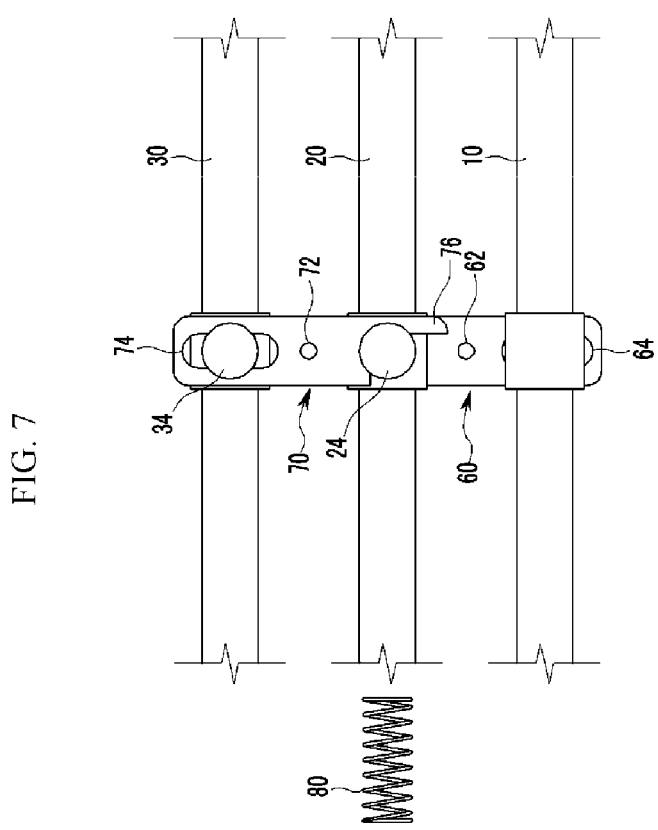
FIG. 7 is a rear view of FIG. 5.

Accordingly, a synchronizer operating device shown in FIG. 5 to FIG. 7 is disposed in the manual transmission according to various embodiments of the present invention. The synchronizer operating device includes first and second rotation links 60 and 70 having band shape and an elastic member 80 pushing the second shift rail 20 to a neutral position.

The first rotation link 60 connects the first shift rail 10 with the second shift rail 20, and a middle portion thereof is fixed to a transmission housing through a hinge 62.

In addition, one end portion of the first rotation link 60 (disposed near the first shift rail 10), as shown in FIG. 6, is provided with a slot 64 having a predetermined length along a length direction thereof such that a hinge protrusion 14 fixed to the first shift rail 10 is slidably inserted in the slot 64. In addition, the other end portion of the first rotation link 60 (disposed near the second shift rail 20) has a side that is cut to a direction to which the sleeve S1 is moved so as to be engaged and the opposite side provided with a supporting portion 66 so as to support a protrusion 22 fixed to the second shift rail 20.

The second rotation link 70 connects the third shift rail 30 with the second shift rail 20, and a middle portion thereof is fixed to the transmission housing through a hinge 72.

One end portion of the second rotation link 70 (disposed near the second shift rail 20), as shown in FIG. 7, has a side that is cut to a direction to which the sleeve S1 is moved so as to be engaged and the opposite side provided with a supporting portion 76 so as to support a protrusion 24 fixed to the second shift rail 20. In addition, the other end of the second rotation link 70 (disposed near the third shift rail 30) is provided with a slot 74 having a predetermined length along a length direction thereof such that a hinge protrusion 34 fixed to the third shift rail 30 is slidably inserted in the slot 64.

Figure 8:
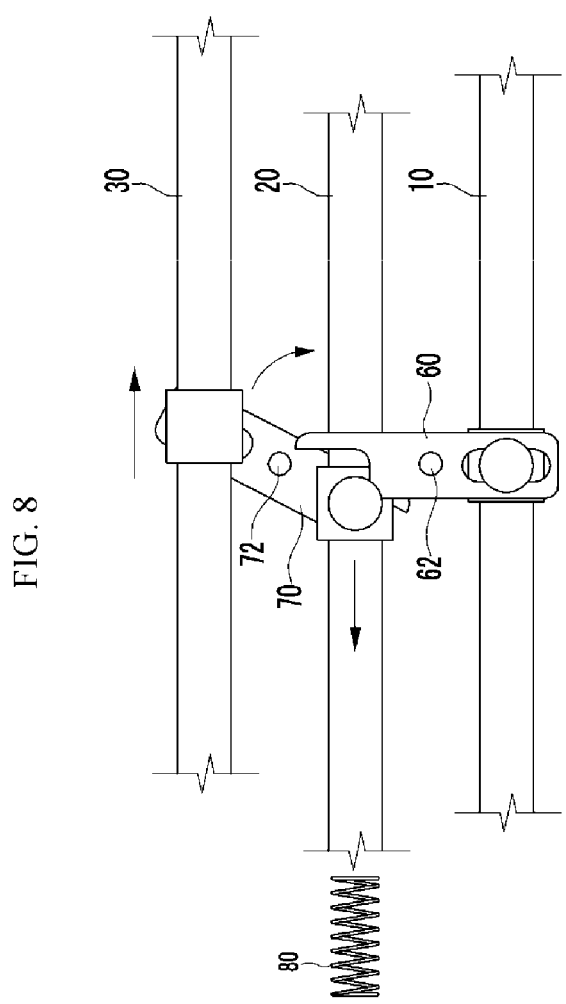
FIG. 8 is an operational diagram of an exemplary synchronizer mechanism at a first forward speed according to the present invention.

As shown in FIG. 8, the third shift rail 30 moves to the right in the drawing in a case of shifting to the first forward speed. At this time, the second rotation link 70 rotates clockwise with respect to the hinge 72 and pushes the second shift rail 20 to the left in the drawing. Therefore, the sleeves S1 and S4 of the first and fourth synchronizer mechanisms SYN1 and SYN4 move to opposite directions of each other and shifting to the first forward speed is achieved.

Figure 9:
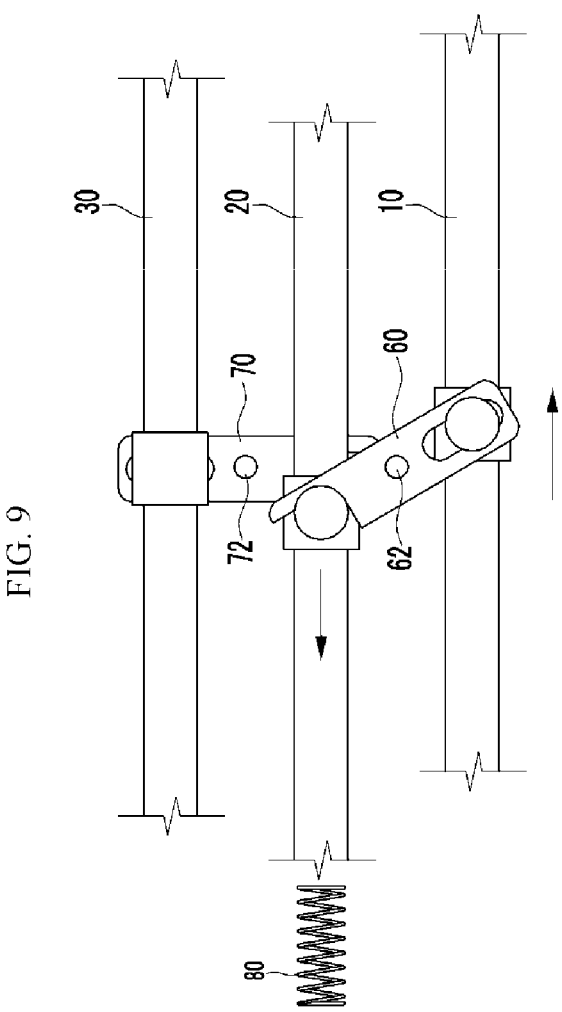
FIG. 9 is an operational diagram of an exemplary synchronizer mechanism at a reverse speed according to the present invention.

In a case of shifting to a neutral state from the first forward speed, the third shift rail 30 is forcibly moved to the left in the drawing by the control finger forming a shift control apparatus, and the second shift rail 20 is moved to the right in the drawing by the elastic force of the elastic member 80 and is returned to an original position thereof In a case of shifting to the reverse speed, the first shift rail 10 is moved to the right in the drawing, as shown in FIG. 9. At this time, the first rotation link 60 rotates anticlockwise with respect to the hinge 62 and pushes the second shift rail 20 to the left in the drawing. Therefore, the sleeves S1 and S5 of the first and fifth synchronizer mechanisms SYN1 and SYN5 move to opposite directions of each other and shifting to the reverse speed is achieved.

In a case of shifting to the neutral state from the reverse speed, the first shift rail 10 is forcibly moved to the left in the drawing by the control finger forming the shift control apparatus, and the second shift rail 20 is moved to the right in the drawing by the elastic force of the elastic member 80 and is returned to the original position thereof In addition, the third shift rail 30 is operated in a case of shifting to the second forward speed. At this time, if the third shift rail 30, as shown in FIG. 10, is moves to the left in the drawing, the second rotation link 70 rotates anticlockwise with respect to the hinge 72. However, since the supporting portion 76 of the second rotation link 70 does not push the protrusion 24 of the second shift rail 20, the second shift rail 20 does not move and the shifting to the second forward speed is achieved.

As described above, the first input gear DI1 is not integrally formed with the input shaft IS and is connected to the input shaft IS through the first synchronizer mechanism SYN1 according to various embodiments of the present invention. Therefore, idling of the first input gear DI1, the first speed gear DO1, and the reverse speed gear RG is prevented at the shift-speeds other than the first forward speed and the reverse speed.

Therefore, occurrence of rattle due to rotational inertia generated by idling of the first input gear DI1, the first speed gear DO1, and the reverse speed gear RG may be prevented.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A manual transmission for vehicles, comprising:
an input shaft having first, second, third, fourth, fifth, and sixth input gears disposed thereon;
an output shaft disposed in parallel with the input shaft at a predetermined distance and having a first output gear and first, second, third, fourth, fifth, and sixth speed gears disposed thereon, the first, second, third, fourth, fifth, and sixth speed gears being respectively engaged with the first, second, third, fourth, fifth, and sixth input gears; and
a reverse speed output shaft disposed in parallel with the output shaft at a predetermined distance and having a second output gear and a reverse speed gear disposed thereon, the reverse speed gear being engaged with the first speed gear;

wherein the first input gear is selectively connected to the input shaft by a first synchronizer mechanism;

the second input gear is monolithically formed with the input shaft;

the third and fourth input gears are selectively connected to the input shaft by a second synchronizer mechanism;

the fifth and sixth input gears are selectively connected to the input shaft by a third synchronizer mechanism;

the first and second speed gears are selectively connected to the output shaft by a fourth synchronizer mechanism;

the third, fourth, fifth, and sixth speed gears are monolithically formed with the output shaft, and the reverse speed gear is selectively connected to the reverse speed output shaft by a fifth synchronizer mechanism.

2. The manual transmission of claim 1, further comprising:

a first shift rail operating the fifth synchronizer mechanism;

a second shift rail operating the first synchronizer mechanism;

a third shift rail operating the fourth synchronizer mechanism;

a fourth shift rail operating the second synchronizer mechanism; and a fifth shift rail operating the third synchronizer mechanism.

3. The manual transmission of claim 2, wherein the first, second, third, fourth, and fifth shift rails are sequentially disposed.

4. The manual transmission of claim 2, wherein the first, third, fourth, and fifth shift rails are respectively provided with a shift lug for moving a corresponding shift rail.

5. The manual transmission of claim 3, further comprising a synchronizer operating device moving the second shift rail by a movement of the first shift rail or the third shift rail.

6. The manual transmission of claim 5, wherein the synchronizer operating device comprises:

a first rotation link connecting the first shift rail with the second shift rail and moving the second shift rail to an opposite direction of a moving direction of the first shift rail when the fifth synchronizer mechanism is operated; and a second rotation link connecting the second shift rail with the third shift rail and moving the second shift rail to an opposite direction of a moving direction of the third shift rail when the fourth synchronizer mechanism is operated.

7. The manual transmission of claim 6, wherein the synchronizer operating device further comprises an elastic member supplying elastic force for returning the second shift rail moved by the movement of the first shift rail or the third shift rail to an original position.

8. The manual transmission of claim 6, wherein the second rotation link is adapted to move the second shift rail in a case the third shift rail moves to one direction and not to move the second shift rail in a case that the third shift rail moves to the other direction.

9. The manual transmission of claim 6, wherein the first rotation link is configured that the movement of the third shift rail is not affected by the movement of the first shift rail.

10. The manual transmission of claim 6, wherein the second rotation link is configured that the movement of the first shift rail is not affected by the movement of the third shift rail.

* * * * *